United States Patent
Patel

(10) Patent No.: US 12,327,170 B2
(45) Date of Patent: **\*Jun. 10, 2025**

(54) NEURAL NETWORK PROCESSING USING SPECIALIZED DATA REPRESENTATION

(71) Applicant: MIPS Tech, LLC, San Jose, CA (US)

(72) Inventor: Sanjay Patel, San Ramon, CA (US)

(73) Assignee: MIPS Tech, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/540,669

(22) Filed: Dec. 14, 2023

(65) Prior Publication Data

US 2024/0127029 A1    Apr. 18, 2024

Related U.S. Application Data

(63) Continuation of application No. 16/704,263, filed on Dec. 5, 2019, now Pat. No. 11,893,470.

(60) Provisional application No. 62/883,155, filed on Aug. 6, 2019, provisional application No. 62/867,966, filed on Jun. 28, 2019, provisional application No. 62/800,431, filed on Feb. 2, 2019, provisional application No. 62/791,788, filed on Jan. 12, 2019, provisional application No. 62/776,032, filed on Dec. 6, 2018.

(51) Int. Cl.
*G06N 3/04* (2023.01)
*G06F 1/16* (2006.01)
*G06F 7/483* (2006.01)
*G06F 17/16* (2006.01)
*G06N 3/08* (2023.01)

(52) U.S. Cl.
CPC ............... *G06N 3/04* (2013.01); *G06F 1/16* (2013.01); *G06F 7/483* (2013.01); *G06F 17/16* (2013.01); *G06N 3/08* (2013.01)

(58) Field of Classification Search
CPC ........................................ G06F 7/483
See application file for complete search history.

(56) References Cited

U.S. PATENT DOCUMENTS

| | | | |
|---|---|---|---|
| 2018/0322382 A1* | 11/2018 | Mellempudi | G06N 3/084 |
| 2019/0042244 A1* | 2/2019 | Henry | G06F 9/30014 |
| 2019/0294413 A1* | 9/2019 | Vantrease | G06F 7/5095 |

\* cited by examiner

*Primary Examiner* — Michael D. Yaary

(57) ABSTRACT

Techniques for neural network processing using specialized data representation are disclosed. Input data for manipulation in a layer of a neural network is obtained. The input data includes image data, where the image data is represented in bfloat16 format without loss of precision. The manipulation of the input data is performed on a processor that supports single-precision operations. The input data is converted to a 16-bit reduced floating-point representation, where the reduced floating-point representation comprises an alternative single-precision data representation mode. The input data is manipulated with one or more 16-bit reduced floating-point data elements. The manipulation includes a multiply and add-accumulate operation. The manipulation further includes a unary operation, a binary operation, or a conversion operation. A result of the manipulating is forwarded to a next layer of the neural network.

20 Claims, 10 Drawing Sheets

NEURAL NETWORK PROCESSING USING SPECIALIZED DATA REPRESENTATION

RELATED APPLICATIONS

This application is a continuation of, and claims the benefit of, U.S. patent application Ser. No. 16/704,263, filed 5 Dec. 2019. U.S. patent application Ser. No. 16/704,263 claims the benefit of U.S. provisional patent applications "Neural Network Processing Using Specialized Data Representation" Ser. No. 62/776,032, filed Dec. 6, 2018, "Address Manipulation Using Indices and Tags" Ser. No. 62/791,788, filed Jan. 12, 2019, "Neural Network Processing Using Mixed-Precision Data Representation" Ser. No. 62/800,431, filed Feb. 2, 2019, "Mixed-Precision Data Computation for Neural Network Reduction Operands" Ser. No. 62/867,966, filed Jun. 28, 2019, and "Neural Network Data Computation Using Mixed-Precision" Ser. No. 62/883,155, filed Aug. 6, 2019.

Each of the foregoing applications is hereby incorporated by reference in its entirety.

FIELD OF ART

This application relates generally to data manipulation and more particularly to neural network processing using specialized data representation

BACKGROUND

The increase in the volume of data such as image data collected from devices and device users continues at an astonishing pace. Data is collected from devices and user activities, including personal electronic devices, online shopping and web surfing, Internet of Things (IoT) devices, smart homes, and numerous additional sources. The collected data is analyzed by governments, researchers, and commercial ventures for a wide range of purposes. The collected data is aggregated into immense datasets often called "big data". Using conventional processors and techniques to analyze this collected data is intractable, simply because the analysis far outstrips the capabilities of the processors and techniques. Additional data needs, including the capture, storage, maintenance, access, transmission, and visualization of the data, can further complicate data analysis. These further data processing and handling requirements quickly saturate the traditional system capabilities such as storage and transfer or networking. Tractable and scalable approaches to data processing and handling are required. Innovative hardware architectures and software techniques, algorithms, heuristics, and so on, are necessitated. Users or owners of the datasets are motivated intellectually or financially to analyze the data contained therein. Other analysis purposes include business analytics; disease detection, tracking, and control; crime detection and prevention; meteorology; and complex science and engineering simulations, to name only a very few. Advanced data analysis techniques are finding applications such as predictive analytics. Further approaches include the application of machine learning and deep learning techniques in support of the data analysis.

Processing architectures that are based on neural networks are promising candidates for the data handling and processing tasks. The neural networks can be based on reconfigurable processor hardware, field programmable gate arrays, application specific gate arrays, and other configurable and reconfigurable architectures. These reconfigurable computing architectures can advantageously integrate many desirable characteristics of hardware and software techniques. A reconfigurable computing architecture can be "recoded" (reprogrammed) to adapt the architecture to a variety of computational approaches. Further, the reconfigurable architecture approach can implement an underlying high-performance hardware architecture. Reconfigurable architectures may be arranged for the many applications that require high performance computing. Applications including digital signal processing (DSP), medical image processing, machine learning, matrix computations, tensor computations, image data analysis, and so on, are successfully served by the capabilities of a reconfigurable architecture. The reconfigurable architecture is particularly well suited to data analysis when the data can include specific types of data, large quantities of unstructured data, sample data, and the like. The reconfigurable architecture can be configured to achieve these and other processing techniques.

SUMMARY

Image data can be processed for a variety of purposes including media production, image processing, machine vision, and so on. The image data such as 8-bit unsigned integer data can be manipulated in a layer of a neural network. The neural network can be particularly well suited to the processing of image data because the neural network can be trained to classify objects, people, animals, etc., and can learn as additional image data is provided to the neural network. A neural network includes processors, where the processor can support single-precision operations. The input data, such as 8-bit unsigned integer image data, can be converted to a floating-point representation. The floating-point representation can include a reduced floating-point representation. The reduced floating-point representation can have the advantages of reduced storage and computation requirements, faster processing rates, faster convergence, and the like. In embodiments, the conversion of the image data to the reduced floating-point representation can be accomplished without loss of precision. The converted input data can be manipulated with one or more reduced floating-point data elements, where the data elements can be related to the neural network. The data elements can include neural network weights, biases, or activations. The manipulation can include a multiply and an add-accumulate operation. The manipulation can include a unary operation, a binary operation, or a conversion operation. The results of the manipulating are forwarded to a next layer with the neural network. The next layer can include a hidden layer, a convolutional layer, an activation layer, a bottleneck layer, or an output layer.

Embodiments include a processor-implemented method for data manipulation comprising: obtaining input data for manipulation in a layer of a neural network, wherein the manipulation is performed on a processor that supports single-precision operations; converting the input data to a 16-bit reduced floating-point representation, wherein the reduced floating-point representation comprises an alternative single-precision data representation mode; manipulating the input data with one or more 16-bit reduced floating-point data elements; and forwarding a result of the manipulating to a next layer of the neural network.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Figure 1:
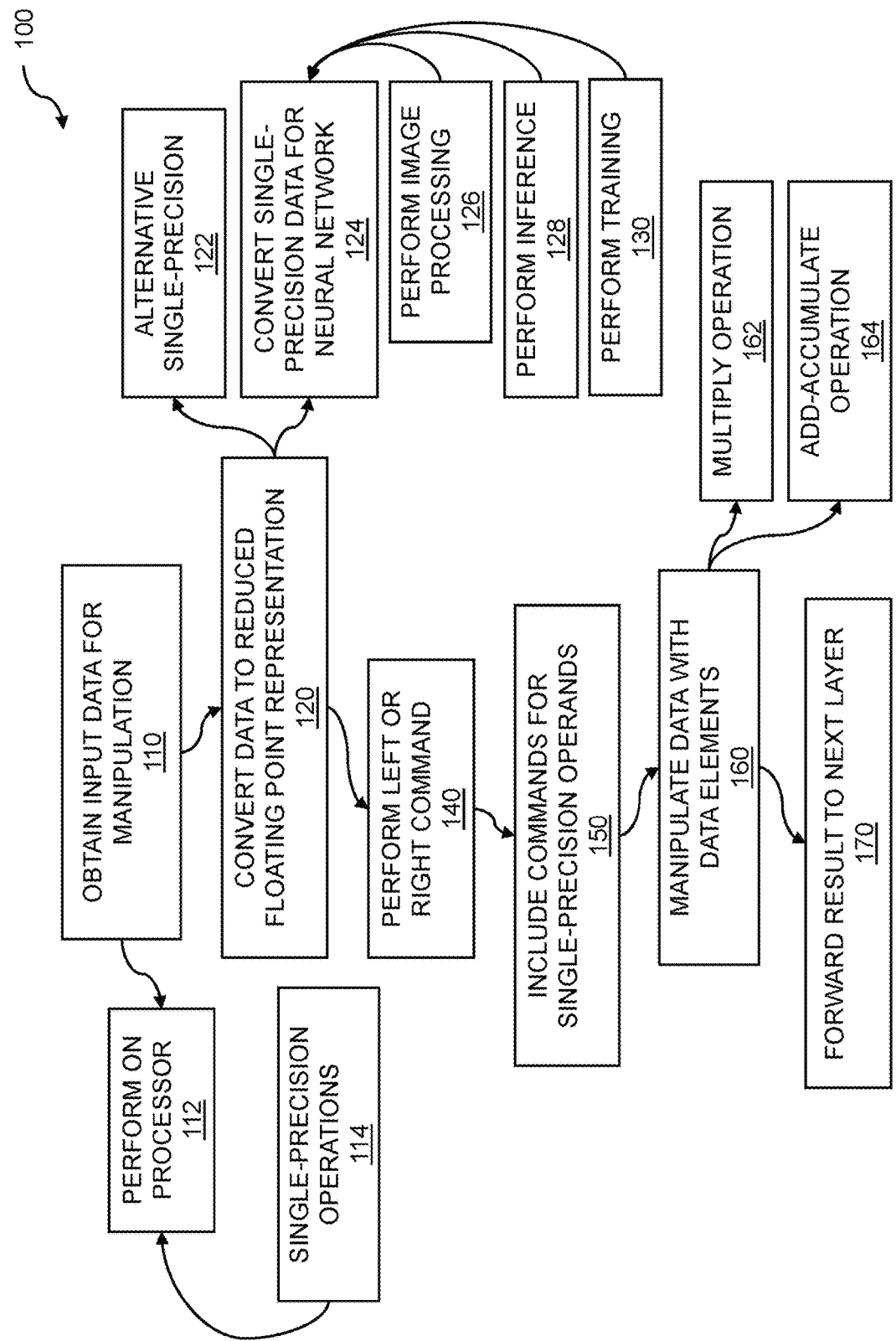
FIG. 1 is a flow diagram for neural network processing using a specialized data structure.

Neural network processing can be performed for data manipulation. A specialized data representation can be chosen for use with a neural network to reduce computational complexity, to increase processing speed, to improve convergence, and so on. Neural networks can be applied to a wide variety of applications such as machine learning, image processing, medical diagnostics, and business analytics, among many others. Several techniques for building neural networks have been proposed. Common techniques include deep neural networks (DNNs), convolutional neural networks (CNNs), recurrent neural networks (RNNs), etc. The choice of technique for implementing a given neural network can be based on the type of data that will be processed by the neural network. In a usage example, a user may choose a convolutional neural network for processing image data. The CNN is configured to mimic the organization of the visual cortex of an animal such as a human. The CNN can be a good choice for image processing since the CNN can require minimal preprocessing of data prior to feeding the data to the CNN. The CNN can be shift invariant or space invariant.

Techniques for neural network processing using specialized data representation are disclosed. The data representation can be used for integer data, single or double-precision data, and so on. Input data for manipulation in a layer of a neural network is obtained. The neural network can include a deep neural network, a convolutional neural network, a recurrent neural network, etc. The manipulation of the data is performed on a processor that supports single-precision operations. The processor can include a computing device, a server device, a processing device, and the like. The processor can be based on one or more processing elements within a reconfigurable fabric, a field programmable gate array, an application specific integrated circuit, etc. The input data is converted to a 16-bit reduced floating-point representation. Conversion can be accomplished via truncation, rounding to zero, or similar operations. The input data, such as 8-bit unsigned integer data that can represent RGB image data, can be converted. In embodiments, the conversion can be performed without loss of precision. The reduced floating-point representation can include an alternative single-precision data representation mode such as bfloat16. The bfloat16 representation comprises 1 sign bit, 8 exponent bits, and 7 explicit significand bits. A total of 8 precision bits (7+1) can be supported. The input data is manipulated with one or more 16-bit reduced floating-point data elements. The 16-bit reduced floating-point data elements can include neural network weights, biases, or activations. The manipulation can include a multiply and add-accumulate operation. The manipulation can include a unary (e.g. single input) operation, a binary (e.g. two input) operation, or a conversion operation. A result of the manipulating is forwarded to a next layer of the neural network. The layer within the neural network to which the result is forwarded can include a convolution layer, a hidden layer, an activation layer, a bottleneck layer, an output layer, etc.

FIG. 1 is a flow diagram for neural network processing using a specialized data structure. A specialized data structure can be used to reduce neural network complexity, to accelerate data manipulation, etc. The data manipulation can be performed without loss of computational precision. The flow 100 includes obtaining input data for manipulation 110 in a layer of a neural network. The input data can include image data such as red-green-blue (RGB) image data. A neural network can comprise a plurality of layers, where the layers can include input layers, output layers, convolutional layers, hidden layers, bottleneck layers, and so on. Various techniques can be used to implement the neural network. In embodiments, the neural network can include a deep neural network (DNN), a convolutional neural network (CNN), a recurrent neural network (RNN), and the like. The manipulation of the input data is performed on a processor 112. One or more processors may be included in a layer of the neural network. In embodiments, the layer of the neural network can include a reconfigurable fabric. The reconfigurable fabric can include one or more elements, where the elements can include one or more of processing elements, switching elements, storage elements, etc. In other embodiments, the layer of the neural network can include a field programmable gate array (FPGA), an application specific integrated circuit (ASIC), a custom integrated circuit, and the like. The manipulation is performed on a processor that supports single-precision operations 114. Single-precision operations, including single-precision floating-point operations, can be based on a standard such as binary32, where 32 bits are used to describe a value. Binary32 comprises a sign bit, eight exponent bits, and 23 bits for a fraction or significand. The manipulation can be performed on one or more processors that support operations based on other precisions such as a 16-bit precision (bfloat16) operations, double-precision (binary64) operations, and so on. The processor can support native operations based on 16 bits, 32 bits, 64 bits, or other precisions.

In embodiments, single-precision data can be used for training at the edge of the neural network. The neural network can be trained in order to improve the efficacy of the neural network to process data such as image data that can be obtained as the input data. The neural network, such as a DNN, CNN, RNN, etc., can be trained using a dataset of known values chosen for the training techniques. Neural network training based on bfloat16, binary32, or binary64, can be computationally intensive due to the processing overhead associated with computations based on floating-point numbers. Once trained, the neural network can be used to process the input data and to make inferences based on the input data. Inferencing techniques are also computationally intensive when the computations are based on floating-point numbering representations. Low precision computations can be used in place of the floating-point computations. Low precision inferencing can be based on 8-bit integer numbering representations particularly when applied to inferencing based on a CNN. The 8-bit integer values can be manipulated with low computational overhead, permitting inferencing to be performed quickly.

Discussed throughout, data based on a numbering representation can be converted to data based on a second numbering representation. Data represented as an 8-bit unsigned integer can be converted to bfloat16, binary32, etc.; bfloat16 can be converted to binary32, binary64, or another numbering representation, etc. Operations that support converting numbering representations or operating on operands based on different numbering representations can be included. In embodiments, a bfloat16 operand can be operated on using techniques similar to those used to operate on single-precision operands. The bfloat16 operand can be expanded to a single-precision representation. Operations based on single-precision representations can be executed. When the operations include training a neural network such as a CNN, weights, biases, etc., can be backpropagated to previous layers within the neural network. Other embodiments can include operations that include hybrid data type support. The hybrid data type can include single-precision values and low precision or integer values. In embodiments, the hybrid data type support can include support for an 8-bit unsigned integer representation and a 16-bit reduced floating-point representation. The operations can include matrix operations such as column major operations, row major operations, and the like.

The flow 100 includes converting the input data to a 16-bit reduced floating-point representation 120. The input data can be based on a variety of numbering formats. The numbering formats can include integer formats including 8-bit unsigned integer; floating-point formats such as single-precision formats (e.g. binary32) or double-precision formats (e.g. binary64); and so on. In embodiments, the numbering format can include a 16-bit reduced floating-point format. The 16-bit reduced floating-point format can include binary floating-point 16 (bfloat16) format. The bfloat16 format is similar to the binary32 format in that both formats include a sign bit and eight exponent bits. The formats can differ in precision since bfloat16 uses seven explicit mantissa or significand bits while binary32 uses 23 bits. In embodiments, the 16-bit reduced floating-point representation can comprise a data structure. The converting the input data can include converting the data from integer to single-precision floating-point binary32; converting unsigned integer to bfloat16; etc. In embodiments, the manipulation is performed on a processor that supports single-precision operations. The processor can include one or more processing elements within a reconfigurable fabric, a field programmable gate array (FPGA), an application specific integrated circuit (ASIC), or the like.

In the flow 100, the reduced floating-point representation comprises an alternative single-precision 122 data representation mode. The alternative single-precision representation mode can include bfloat16 as discussed throughout, a hybrid data type, and so on. In embodiments, the hybrid data type can include support for an 8-bit unsigned integer representation, a 16-bit reduced floating-point representation, a bfloat16 representation, etc. The flow 100 includes converting the single-precision data representations into 16-bit reduced floating-point data representations for use in neural network 124 processing. The neural network processing can be applied to a variety of application areas. In embodiments, the neural network processing includes image processing 126. Image processing techniques can be applied to analyzing still images, video frames from a video stream, and so on. The image processing can be based on RGB image data, where the RGB image data is based on an 8-bit unsigned integer data representation. In other embodiments, the neural network processing includes performing an inference operation 128. An inference operation can be performed by a neural network to infer whether data, such as image data, contains a person, an object, an animal, etc. In further embodiments, the neural network processing includes performing a training operation 130. A training operation can be performed by a neural network. The training of the neural network can include using known, training data in order to "teach" the neural network to make inferences, such as inferences regarding the contents of image data.

The flow 100 includes performing left or right versions of processor commands 140 that support single-precision operations to handle 8-bit unsigned integer input. Since the sizes of the data representations can differ, such as 8-bit unsigned integer data or 16-bit bfloat16 data, operations that mix data representations can require more than one version. In embodiments, the performing enables hybrid data type support. The hybrid data type support can include operations that are based on the different data types such as integers, single-precision formats, double-precision formats, etc. In embodiments, the hybrid data type support can include support for an 8-bit unsigned integer representation and a 16-bit reduced floating-point representation. A usage example includes multiplying a bfloat16 16-bit number by an unsigned integer number. Such an operation can require multiplying low order bits (the right version), multiplying high order bits (the left version), then adding the two partial products together to calculate the product. Other operations can include left and right versions of commands.

The flow 100 comprises including processor commands that support single-precision operands 150 and 16-bit reduced floating-point representation operands in the same operation. Recall that single-precision number representation such as binary32 includes 32 bits and a reduced floating-point representation can include 16 bits. The latter representation can include a bfloat16 representation. The binary32 and bfloat16 representations differ in the number of bits used to represent the significand. The bfloat16 data can be converted to binary32 without loss of precision, but binary32 data, if converted to bfloat16, loses precision. The operands can include image data. The image data can be represented using a variety of numbering formats. The image data can include an 8-bit unsigned integer RGB representation. In embodiments, the image data can be represented in bfloat16 format without loss of precision. The 8-bit unsigned integer RGB data can be converted to bfloat16. In embodiments, the same operation includes matrix multiplication. Other operations can include logic operations, mathematical operations, etc. In embodiments, the matrix multiplication can include performing a dot-product or a multiply-and-accumulate calculation. A dot-product calculation is based on determining a sum of products for two equal length sequences of numbers. A multiply-and-accumulate calculation comprises computing a product (multiplication) of two corresponding numbers from the two sequences and adding the product to a running sum or total (accumulation). Accumulation can store the running sum in a register, memory, or other storage component. In further embodiments, the same operation includes a tensor operation.

The flow 100 includes manipulating the input data with one or more 16-bit reduced floating-point data elements 160. The manipulating can be performed by a processor that supports single-precision operations, reduced floating-point operations, and so on. In embodiments, the manipulating can include mixed floating-point data elements. The manipulating can include integer data elements and floating-point elements. The mixed floating-point data elements include single-precision data elements or double-precision data elements. In embodiments, the manipulation includes a multiply 162 and an add-accumulate operation 164. The multiplication and add-accumulate operations can accomplish multiplications of numbers having an arbitrary length. In a usage example, consider the multiplication of 23*17. The product can be calculated by multiplying 23*7, shifting left one position, and multiplying 23*1. The two partial products 161 and 230 are added to calculate the sum 391. In embodiments, the manipulation can include a unary operation, a binary operation, or a conversion operation. A unary or "horizontal" operation can operate on a single value, vector, and so on. A binary or "vertical" operation can operate on pairs of values, vectors, etc. A conversion operation can convert data from one representation to another representation, such as converting an 8-bit unsigned binary operation to bfloat16. The flow 100 includes forwarding a result of the manipulating to a next layer of the neural network 170. Recall that the neural network can include a plurality of layers, where the layers can include input layers, output layers, convolution layers, hidden layers, or bottleneck layers, and so on. Manipulation results can be forwarded to a next layer irrespective of the type of neural network. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
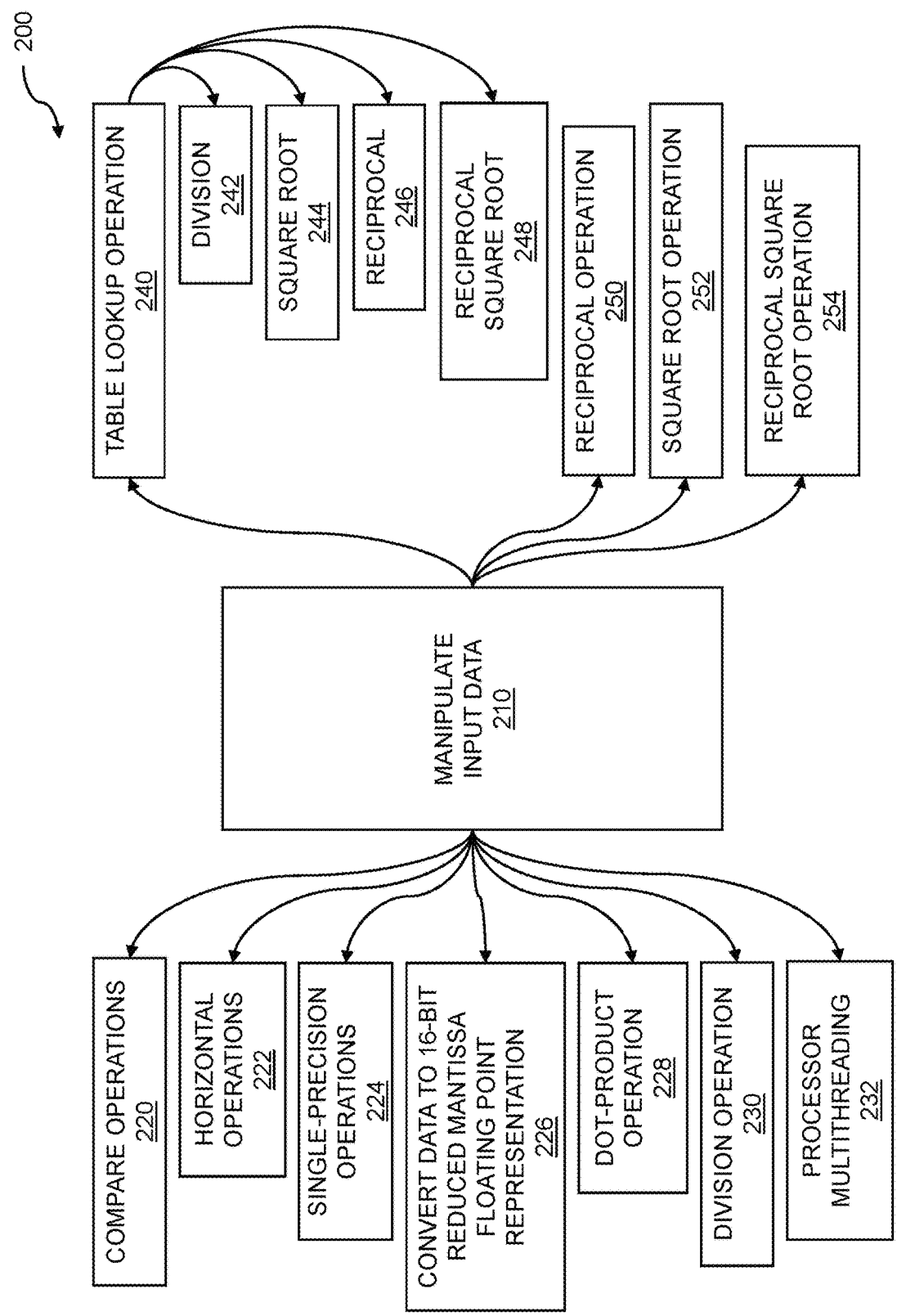
FIG. 2 is a flow diagram for data manipulation.

FIG. 2 is a flow diagram for data manipulation. Input data such as image data can be manipulated by a neural network. Processing by the neural network uses specialized data representation. Input data is obtained for manipulation in a layer of a neural network. The manipulation is performed on a processor that supports single-precision operations. The data is converted for manipulation in a layer of a neural network. The manipulation is performed on a processor that supports single-precision operations. The input data is manipulated with one or more 16-bit reduced floating-point data elements. A result of the manipulating is forwarded to a next layer of the neural network.

The flow 200 includes manipulating the input data 210 with one or more 16-bit reduced floating-point data elements. The manipulating can include performing one or more operations, where the operations can include logical operations, mathematical operations, matrix operations, tensor operations, and so on. The manipulating can be performed on a processor within a neural network. The floating-point elements can relate to the neural network. In embodiments, the one or more 16-bit reduced floating-point data elements can include one or more neural network weights. The weights within the neural network can be used to assign a relative importance of an input to a neuron within a layer of the neural network. The weights can be trained using single-precision data representations. In embodiments, the one or more 16-bit reduced floating-point data elements can include one or more neural network biases. A neural network bias can include a node with a constant value such as one. The bias node can be used to ensure that the output of an element (neuron, perceptron) of a neural network does not always converge to a value such as zero. In embodiments, the one or more 16-bit reduced floating-point data elements can include one or more neural network activations. A neural network activation, or activation function, can be used to determine whether a given neuron within the neural network should be activated. The activation can be decided based on calculating a weighted sum of the inputs and adding a bias to the weighted sum. The activation can introduce nonlinearity to the output of a neuron within the neural network. The neuron can be located within a hidden layer of the neural network.

The data manipulation can include a variety of operations such as logical operations and mathematical operations. The flow 200 includes performing one or more comparing operations 220. Comparing operations can include logical comparisons, mathematical comparisons, data type comparisons, and the like. A mathematical comparison values A and B, for example, can determine whether A>B; A=B, A<B, etc. The flow 200 includes performing horizontal operations 222. The horizontal operations for manipulating input data can include performing left or right versions of commands for the processor that supports single-precision operations to handle 8-bit unsigned integer input. The 8-bit unsigned integer input can include image data such as red-green-blue (RGB) image data. In embodiments, the performing enables hybrid data type support. Hybrid data type support can include handing different types of data such as integer data, floating-point data, etc. In embodiments, the hybrid data type support can include support for an 8-bit unsigned integer representation and a 16-bit reduced floating-point representation.

The flow 200 includes performing single-precision operations 224. The single-precision operations can be based on a number format including a standard number format. A standard number format can include a binary32 format in which a floating-point number can be represented in 32 bits. The flow 200 includes converting the single-precision data representations into 16-bit reduced floating-point data representations, including a reduced mantissa floating-point representation 226, for use in neural network processing. The 16-bit reduced floating-point data representation can include a bfloat16 number format. A bfloat16 number format and a single-precision floating-point format can each include a sign bit and eight bits for representing an exponent. The bfloat16 and binary32 formats differ in that the bfloat16 format uses seven bits for the mantissa or significand, while the binary32 format uses 23 bits for the significand. In embodiments, the operation can include matrix multiplication. In the flow 200, the matrix multiplication includes performing a dot-product operation 228 or a multiply-and-accumulate calculation. A dot product between two equal length sequences of numbers can be computed as a sum of products. Products between corresponding numbers in the sequences are calculated, and the products are added to a running total or accumulation. In embodiments, the operation can include a tensor operation.

In the flow 200, the manipulating includes a division operation 230. The division operation can be based on division of integers, unsigned integers, floating-point representations, and the like. Various techniques can be used to perform a division operation including repeated subtraction. In the flow 200, the manipulating supports processor multithreading 232. In embodiments, the input data includes single instruction, multiple data (SIMD) data representations. SIMD data representations provide a single instruction for operating on or manipulating multiple data elements. The multiple data elements can be operated on in parallel. The data elements can include similar data element types or mixed data types. In embodiments, the SIMD representations can include 8-bit unsigned integer data elements, 16-bit reduced floating-point representation data elements, or 32-bit single-precision data elements. The SIMD representations can include double-precision data elements.

In the flow 200, the operation employs a table lookup function 240 to accomplish an operation. As discussed throughout, the operation can include a logical operation, a mathematical operation, a matrix operation, a tensor operation, etc. In the flow 200, the table lookup function can be used to accomplish a division 242. The division can include signed or unsigned integer representations, bfloat16 representations, binary32 representations, and the like. The lookup table can be used to determine a quotient and a remainder for division of arbitrary numbers. The lookup table technique can be significantly faster than "brute force" division techniques such as repeated subtraction. In embodiments, the table lookup function can take 7+1 input bits to yield a 19-bit output. The 7+1 input bits can include the seven explicit fractions of significand bits plus one implicit bit from a bfloat16 number representation. In the flow 200, the table lookup function can be used to accomplish a square root 244. The lookup table function can be used to determine an approximate result for the square root calculation. The approximate solution can enable faster convergence of the square root calculation. In the flow 200, the table lookup function can be used to accomplish a reciprocal 246. As for the calculation of the square root, the lookup table function can be used to determine an approximate result for the reciprocal calculation thus speeding convergence of a solution. In the flow 200, the table lookup function can be used to accomplish a reciprocal square root 248 calculation. The lookup table function can be used to look up an initial, approximate reciprocal square root. Additional iterations can be performed to calculate a converged result for the reciprocal square root.

In the flow 200, the manipulating comprises a reciprocal operation 250. The reciprocal operation is based on 1 divided by the value for which a reciprocal is sought. The division can be accomplished using a table lookup, repeated subtraction, and so on. In the flow 200, the manipulating comprises a square root operation 252. The square root operation can be accomplished by factoring the number for which a square root is sought into perfect squares, by table lookup, by estimation, and the like. In the flow 200, the manipulating comprises a reciprocal square root operation 254. The reciprocal square root operation can be performed by computing the square and dividing one by the square root. Various embodiments of the flow 200 can be included in a computer program product embodied in a non-transitory computer readable medium that includes code executable by one or more processors.

Figure 3A:
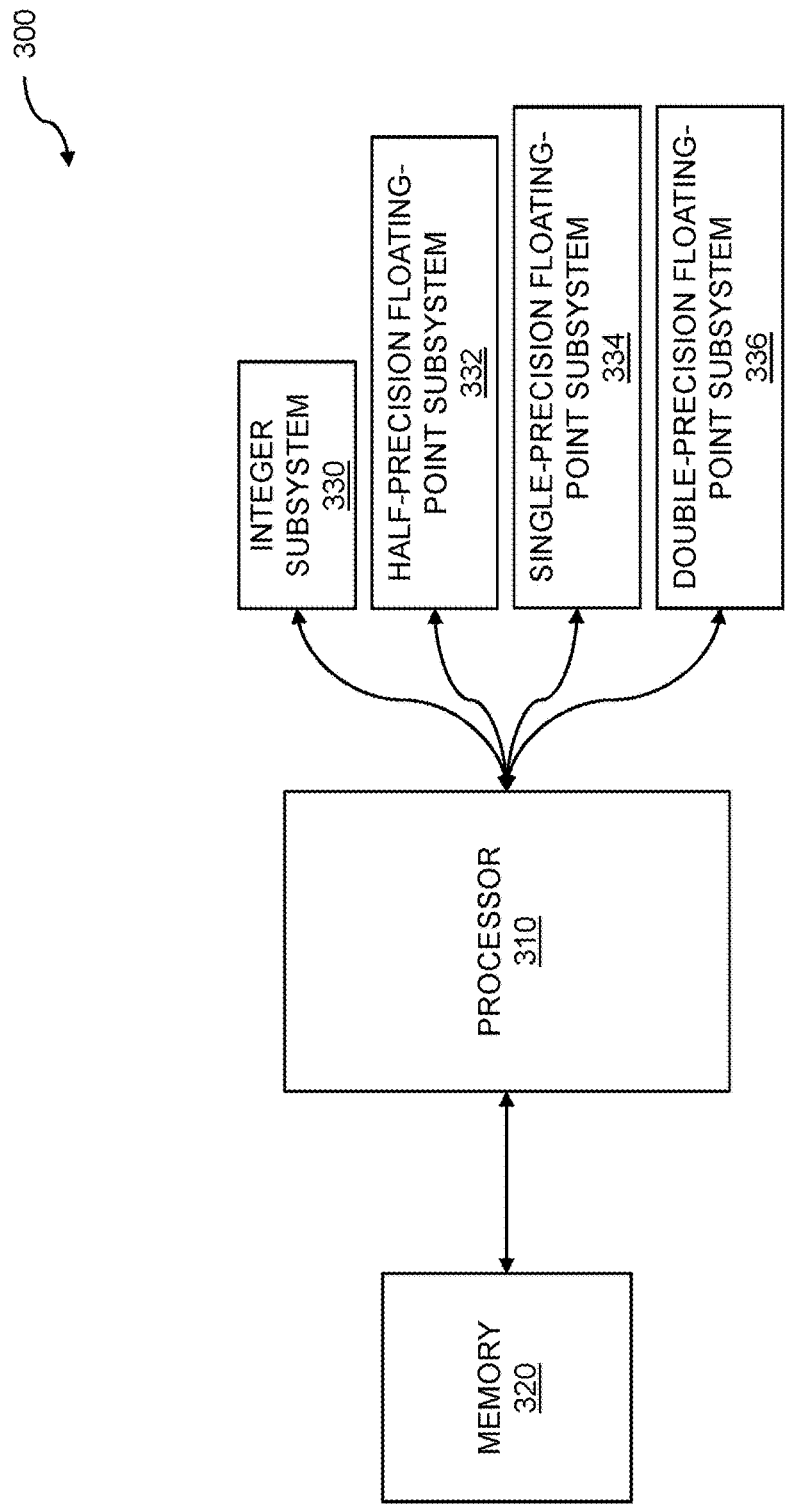
FIG. 3A is a block diagram for a processor system.

FIG. 3A is a block diagram for a processor system 300. A processor system can be used to perform data manipulation for one or more layers of a neural network. The processor can support neural network processing using specialized data representation. Input data is obtained for manipulation in a layer of a neural network. The manipulation is performed on a processor that supports single-precision operations. The input data is converted to a 16-bit reduced floating-point representation, where the reduced floating-point representation comprises an alternative single-precision data representation mode. The input data is manipulated with one or more 16-bit reduced floating-point data elements. The elements can include neural network weights, biases, or activations. A result of the manipulating is forwarded to a next layer of the neural network.

A processor system can include one or more processors 310 connected to memory 320. The processors can be included in a neural network, where the neural network can include a convolutional neural network, a deep neural network, a recurrent neural network, and so on. The memory can include random access memory (RAM), memory accessible through direct memory access (DMA), high bandwidth memory (HBM), and the like. The processor can be coupled to one or more subsystems, where the subsystems can support operations based on a variety of number formats that can be manipulated by the processor. The operations can include logical operations, arithmetic operations, matrix operations, or tensor operations, etc. The subsystems can include an integer subsystem 330. The integer subsystem can support signed or unsigned integers. The subsystems can include a half-precision floating-point subsystem 332. The half-precision subsystem can be based on a 16-bit floating-point number format. The 16-bit floating-point number format can include 16-bit floating-point bfloat16. The subsystems can include a single-precision floating-point subsystem 334. The single-precision floating-point subsystem can be based on a standard 32-bit floating-point number format such as binary32. The subsystems can include a double-precision floating-point subsystem 336. The double-precision floating-point subsystem can be based on a standard 64-bit floating-point number format such as binary64.

Figure 3B:
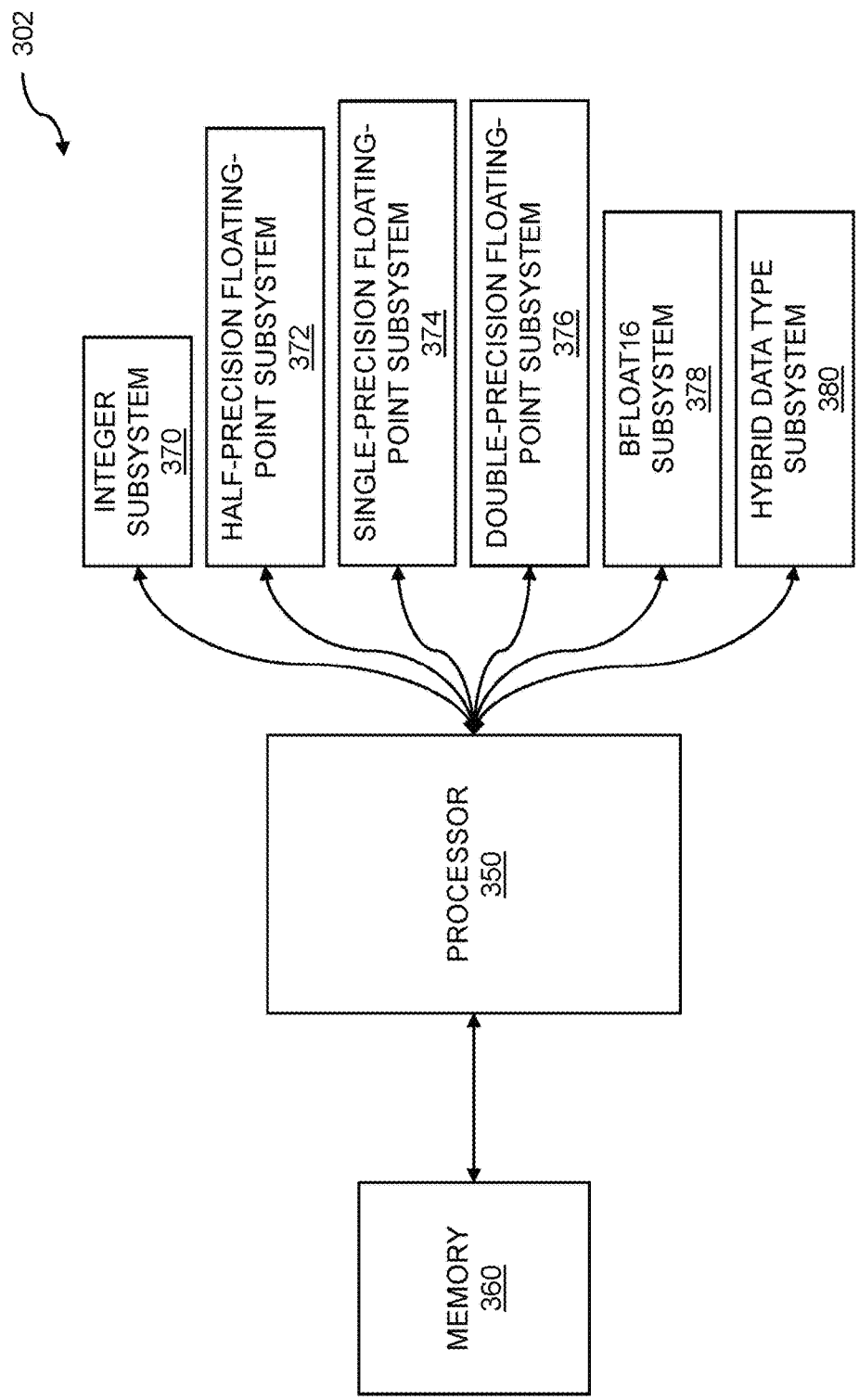
FIG. 3B is a block diagram for a processor system with bfloat16.

FIG. 3B is a block diagram for a processor system with bfloat16. As stated above, a processor system can perform data manipulation in a layer of a neural network. The neural network can include a deep neural network (DNN), a convolutional neural network (CNN), a recurrent neural network (RNN), or other neural network appropriate to data manipulation. Neural network processing uses specialized data representation. The processor that performs the data manipulation supports single-precision operations, so obtained data that is in other number formats, such as RGB image data in unsigned integer format, can be converted prior to manipulation. Manipulation results are forwarded to another layer within the neural network.

A processor system with bfloat16 number representation 302 can include one or more processors 350 connected to memory 360. The one or more single-precision processors can manipulate data for a layer in a neural network. The memory can include RAM, DMA, HBM, or other appropriate storage. The processor 350 can be coupled to one or more subsystems that support operations. The operations that can be performed by the subsystems can be based on one or more number formats that can be manipulated by the processor. The operations performed by the one or more processors can include logical operations, arithmetic operations, matrix operations, tensor operations, etc. The subsystems can include an integer subsystem 370, where the integer subsystem can support signed integers or unsigned integers. The subsystems can include a half-precision floating-point subsystem 372. The half-precision subsystem can be based on a 16-bit floating-point number format. The subsystems can include a single-precision floating-point subsystem 374 such as a subsystem based on a standard 32-bit floating-point number format including binary32. The subsystems can include a double-precision floating-point subsystem 376. The double-precision floating-point subsystem can be based on a standard 64-bit floating-point number format including binary64. The subsystems can include a floating-point 16 (bfloat16) 378 subsystem. The bfloat16 representation, which can occupy 16 bits, can support a wide range of floating-point numbers. The bfloat16 representation is similar to the binary32 floating-point representation in that each representation includes a sign bit and eight exponent bits. The formats differ in that the bfloat16 representation includes seven significand bits while the binary32 format includes 23 significand bits. While the larger number of significand bits of the binary32 representation can support higher precision, the smaller number of significand bits of the bfloat16 representation can support simpler processor design, faster computations, reduced storage requirements, and so on. The subsystems can include a hybrid data type subsystem 380. The hybrid data subsystem can perform operations based on a hybrid data type that manipulates an 8-bit unsigned integer representation and a 16-bit reduced floating-point representation. The 16-bit reduced floating-point representation can include a bfloat16 representation.

Figure 4:
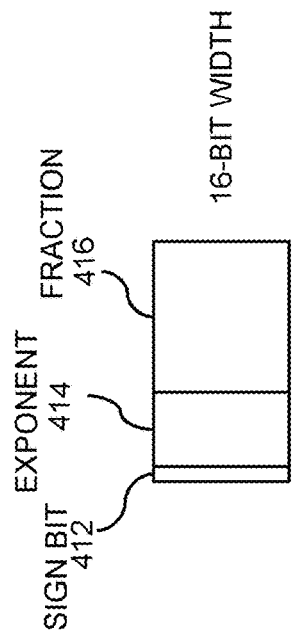
FIG. 4 illustrates conversion from bfloat16 for single precision.
Figure 4:
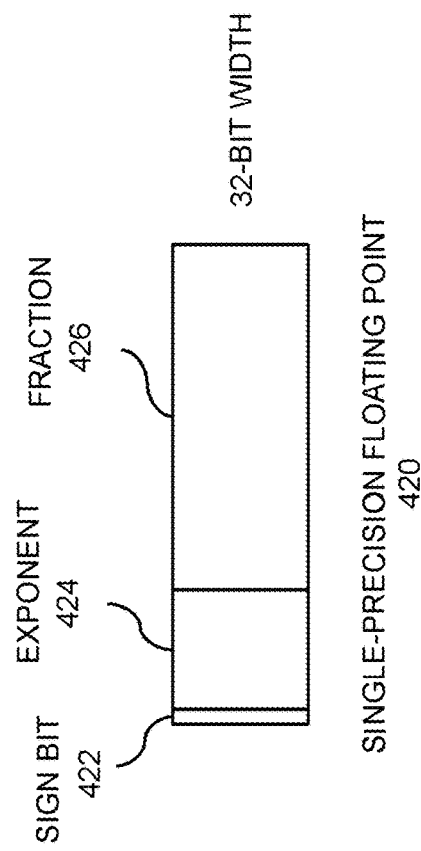

FIG. 4 illustrates conversion from bfloat16 for single precision. Data can be manipulated based on various operations such as logical operations, arithmetic operations, matrix operations, tensor operations, and the like. A processor can perform the manipulating, where the processor can support operations based on a numerical representation such as single-precision floating-point representation. The representation can support neural network processing using specialized data representation. Input data is obtained for manipulation in a layer of a neural network. The manipulation is performed on a processor that supports single-precision operations. The input data is converted to a 16-bit reduced floating-point representation, where the reduced floating-point representation includes an alternative single-precision data representation mode. The input data is manipulated with one or more 16-bit reduced floating-point data elements. The one or more 16-bit reduced floating-point data elements include one or more neural network weights, one or more neural network biases, or one or more neural network activations. A result of the manipulating is forwarded to a next layer of the neural network. The next layer can be an output layer, a fully connected layer, a convolution layer, a pooling layer, a rectified linear unit (ReLU) layer, a bottleneck layer, and so on.

Two floating-point representations are shown 400. The floating-point representations can include a 16 floating-point (bfloat16) representation 410, and a single-precision floating-point (binary32) representation 420. Other floating-point representations, such as double-precision floating-point (binary64) representations may also be used. The bfloat16 representation comprises a sign bit 412, an 8-bit field for an exponent 414, and a 7-bit field for a fraction or significand 416. While only seven bits of the significand are stored, the storing the significand can support eight bits of precision. The binary32, or single-precision, representation comprises a sign bit 422, an 8-bit field for an exponent 424, and a 23-bit field for the fraction or significand 426. The differences between the bfloat16 representation and the binary32 representation are the number of bits of the significand and the precision of the significand. To convert from the binary32 to the bfloat16 representation, the significand can be truncated or rounded to fit within the reduced number of bits. To convert from the bfloat16 to the binary32 representation, the significand can be padded with ones or zeros to fill out the increased number of bits.

Figure 5:
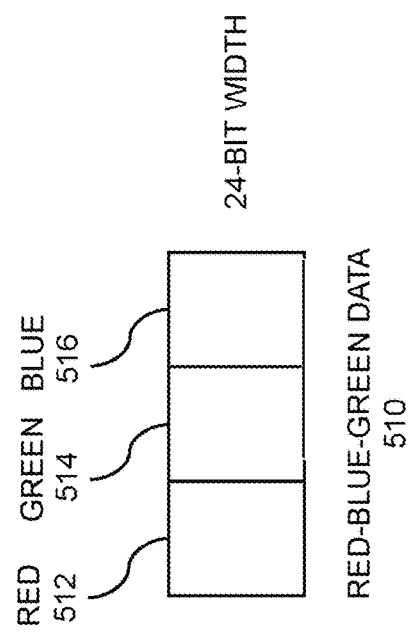
FIG. 5 shows conversion from RGB image data to bfloat16.
Figure 5:
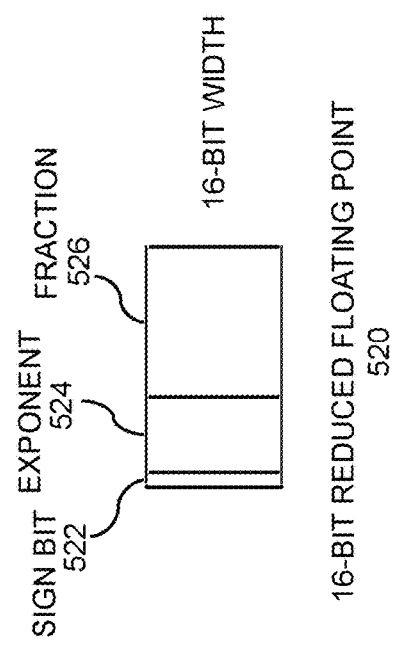

FIG. 5 shows conversion from RGB image data to bfloat16 500. Image data, such as red-green-blue (RGB) image data, can be represented using an 8-bit unsigned integer format. Processors that can be used to operate on the image data can support operations based on a single-precision floating-point representation. The processors can be included within a neural network. In order for the RGB image data to be manipulated, the image data can be converted to the single-precision floating-point representation. The single-precision floating-point representation can be used for neural network processing using specialized data representation. Input data is obtained for manipulation in a layer of a neural network, where the manipulation is performed on a processor that supports single-precision operations. The input data is converted to a 16-bit reduced floating-point representation, wherein the reduced floating-point representation comprises an alternative single-precision data representation mode. The input data is manipulated with one or more 16-bit reduced floating-point data elements. A result of the manipulating is forwarded to a next layer of the neural network.

Image data, such as RGB image data, can be represented in a plurality of bytes, where an 8-bit byte is used for each color 510. A byte can represent a value, intensity, or magnitude for red 512, one for green 514, and one for blue 516. Each color can be represented by an 8-bit unsigned integer. To process the RGB image data, each 8-bit (1 byte) unsigned integer can be converted to a floating-point representation, where the floating-point representation can be manipulated by a processor. The floating-point representation can include a 16-bit reduced floating-point 520 representation such as bfloat16. Bfloat16 can represent a wide range of values by basing the representation of the values on a floating radix point. The bfloat16 representation includes a sign bit 522, an 8-bit exponent 524, and a 7-bit fraction or significand 526. While seven bits are explicitly stored within the bfloat16 value, the value of the significand can include eight bits of precision. Bfloat16 representations share the sign bit and the number of exponent bits (eight bits) of single-precision floating-point (binary32) representations. The binary32 representation uses a total of 32 bits for each floating-point value. The loss of precision of bfloat16 versus binary32 results from bfloat16 using only seven bits for representing the significand, while binary32 uses 23 bits. Conversion between binary32 and bfloat16 representations can be accomplished by truncating or rounding the value represented by 23 bits in the binary32 representation to seven bits in the bfloat16 representation.

Figure 6:
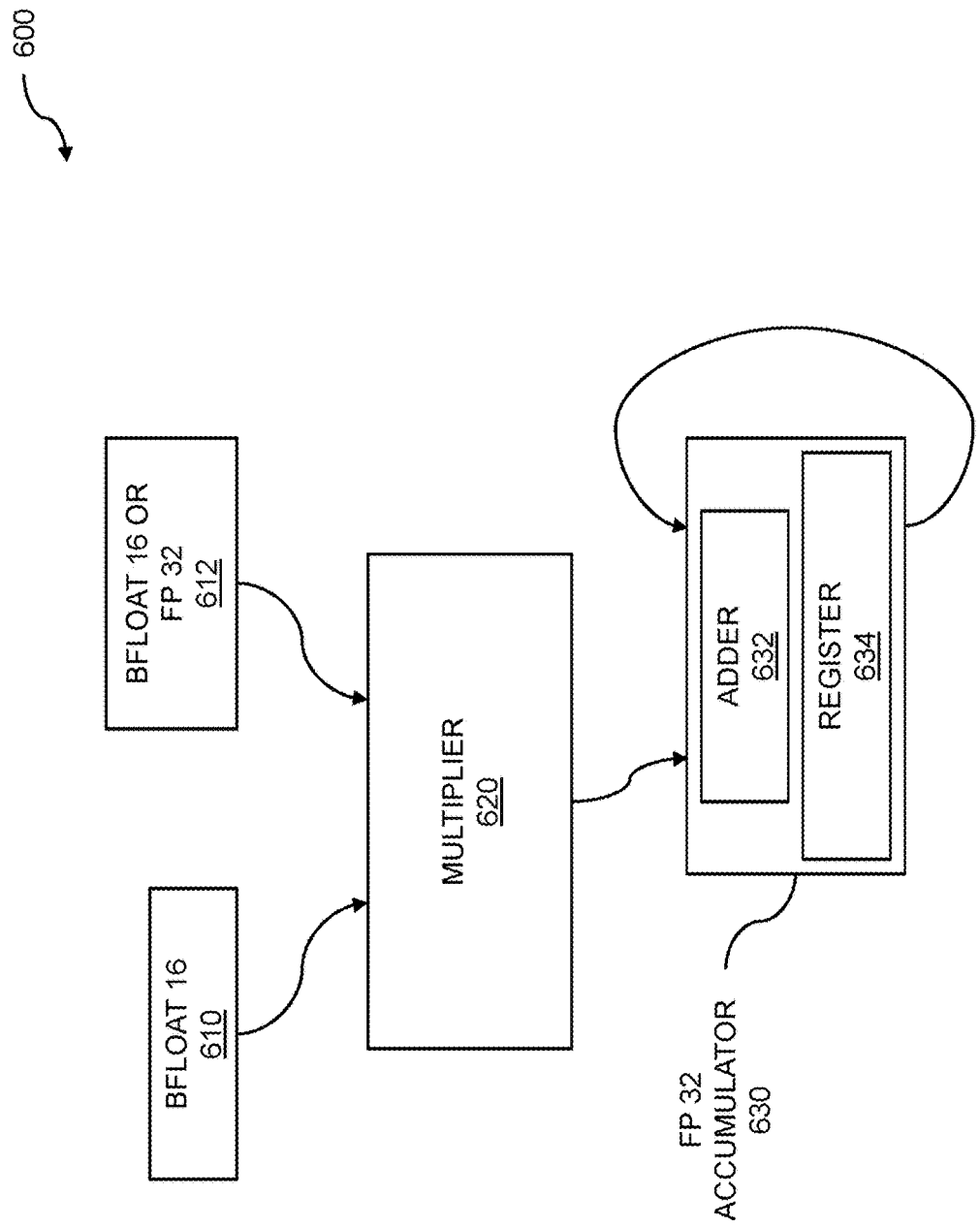
FIG. 6 illustrates 128-bit bfloat16 dot-product logic.

FIG. 6 illustrates 128-bit bfloat16 dot-product logic. A dot product or scalar product can be computed for two sequences of numbers, where the sequences of numbers are of equal length. Data manipulation such as the dot product can be performed on a processor. The dot product can be computed for neural network processing using specialized data representation. Input data is obtained for manipulation in a layer of a neural network, where the manipulation is performed on a processor that supports single-precision operations. The input data is converted to a 16-bit reduced floating-point representation, where the reduced floating-point representation comprises an alternative single-precision data representation mode. Input data is manipulated with one or more 16-bit reduced floating-point data elements, and a result of the manipulating is forwarded to a next layer of the neural network.

The dot product of two sequences of numbers can be computed by summing the products of corresponding numbers from each of the two sequences of numbers. That is, the first two numbers are multiplied together; the second two numbers are multiplied together and their product is added to the product of the first pair of numbers; the third two numbers are multiplied together and their product is added to the prior products; and so on for each pair of numbers in the two sequences of numbers. The sequences of numbers can be coordinate vectors. In geometric terms, the dot product, also called the inner product, can be the product of the Euclidean magnitudes of the vectors and the cosine of the angle found between the two vectors. The dot product can be used for determining vector lengths and other computations.

A block diagram for 128-bit bfloat16 dot-product logic is shown 600. The two sequences of numbers can include input data for manipulation in a layer of a neural network. The two sequences can include image data, such as unsigned 8-bit RGB image data, that can be converted to a 16-bit reduced floating-point representation. For computing the bfloat16 dot product, the sequences of numbers can include an RGB image converted to bfloat16 610 representation; a bfloat16 or floating-point 32 612 (binary32) representation, and so on. To compute the products of the corresponding numbers from each of the two input sequences, a multiplier 620 can be used. The multiplier can be based on various numbers of bits to support a variety of precisions. In embodiments, the multiplier can be based on single-precision floating point (binary32), double-precision floating point (binary64), and so on. As the product of each corresponding pair of numbers in the sequences of numbers is computed, an accumulation or "running total" can be computed using an accumulator. The accumulator can include a single-precision floating-point (fp32, binary32) accumulator 630. The accumulator can include an adder 632 and a register 634. The accumulator can be used for summing the product currently output from the multiplier and the previous running total. The register can be used for storing the running total. If the precision of the accumulator is less than that of the multiplier, the values manipulated within the accumulator can be determined by rounding or truncating the higher precision values computed by the multiplier.

Figure 7:
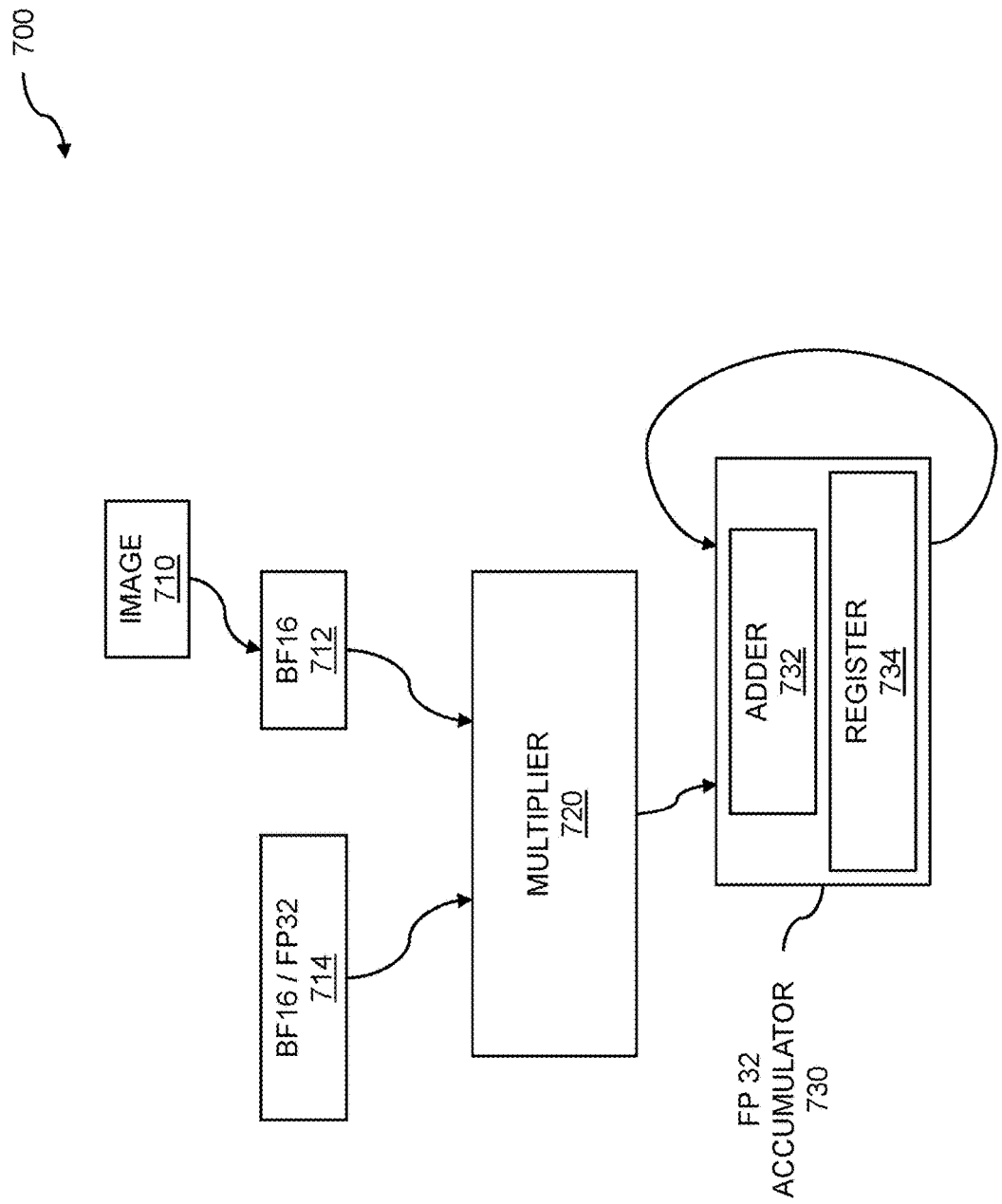
FIG. 7 shows 128-bit RGB data dot-product logic.

FIG. 7 shows 128-bit RGB data dot-product logic. Described throughout, a dot product between two equal length sequences of numbers can be computed as a sum of products of the corresponding entries in the sequences. The sum of products can be computed using various precisions such as bfloat16, binary32, binary64, and so on. The computing the dot product can be based on a 16-bit reduced floating-point representation. The sequences of numbers can include red-green-blue (RGB) data such as the RGB data that can describe an image. Since a processor on which data such as the RGB image data can be processed can support single-precision or other precision operations, the data to be processed may require conversion. The data can be converted from its native precision to the native precision of the processor on which the computations are performed. The processing can include neural network processing using specialized data representation. Input data is obtained for manipulation in a layer of a neural network, where the manipulation is performed on a processor that supports single-precision operations. The input data is converted to a 16-bit reduced floating-point representation, where the reduced floating-point representation comprises an alternative single-precision data representation mode. The input data is manipulated with one or more 16-bit reduced floating-point data elements. A result of the manipulating is forwarded to a next layer of the neural network.

A diagram for 128-bit RGB data dot-product logic is shown 700. A dot-product operation can be performed on data such as image data. In embodiments, the image data can use an 8-bit unsigned integer RGB representation 710. In an 8-bit unsigned integer representation, the eight bits can represent a value between zero and 255 (2^8−1). Recall that manipulations on the obtained input data are performed on a processor that supports operations such as single-precision operations. The unsigned 8-bit integer RGB data is converted to a 16-bit reduced floating-point representation. In embodiments, the RGB image data can be represented in bfloat16 712 format without loss of precision. The dot product operation or other operations can include mixed-precision operations. Mixed precision operations can include addition, subtraction, multiplication, division, square root, reciprocal, reciprocal square root, and so on. The mixed precision operations can be performed on operands that are represented using different precisions. The mixed-precision operations can be performed on operands such as 8-bit unsigned integer and bfloat16; bfloat16 and binary32, 8-bit unsigned integer and binary32, and so on. The RGB data converted to bfloat16 format can be multiplied by a bfloat16 value or a floating-point 32 (binary32) value 714. Recall that bfloat16 and float32 both represent floating-point values using the same sign, exponent, and significand representations. The distinction between the bfloat16 and binary32 formats is that bfloat16 uses seven explicitly stored bits while binary32 uses 23 bits. The multiplication of a number in bfloat16 representation can be multiplied directly by another bfloat16 number. A bfloat16 number in a bfloat16 representation can be multiplied by a binary32 number by padding the bfloat16 number with 23−7=16 zeros to fill out the additional significand bits.

The input data can be converted to other representations such as hybrid representations or hybrid numbering types which can be supported for data manipulations. In embodiments, the hybrid data type support can include support for an 8-bit unsigned integer representation and a 16-bit reduced floating-point representation. Recall that the processor that performs the data manipulations can perform single-precision operations. Embodiments can include performing left or right versions of commands. The left or right versions of commands can be used to perform operations on numbers that are represented using different numbering schemes. In a usage example, a bfloat16 number can be multiplied by a binary32 number. A left version of the command can multiply the seven bits of the bfloat16 significand with seven most significant bits (MSBs) of the binary32 significand. The right version of the command can multiply the seven bits of the bfloat16 significand by the 16 least significant bits (LSB) of the binary32 significand.

The dot product is determined by computing a sum of products. The products can be determined using a multiplier 720. The multiplier can be used to determine products of a given bit width. The bit width can be chosen based on the desired precision for the multiplications, where the precision can include single precision (binary32), double precision (binary64), and so on. Products or partial products based on lower precision can be computed based on truncation, rounding, approximation, and the like. The sums of products can be computed based on an accumulator. In embodiments, the accumulator can be based on a single-precision floating-point accumulator 730. An accumulator can perform operations including addition and storage. In embodiments, the accumulator 730 can include an adder 732 and a register 734. A product or partial product from the multiplier can be added to a previous partial product or value within the accumulator.

Figure 8:
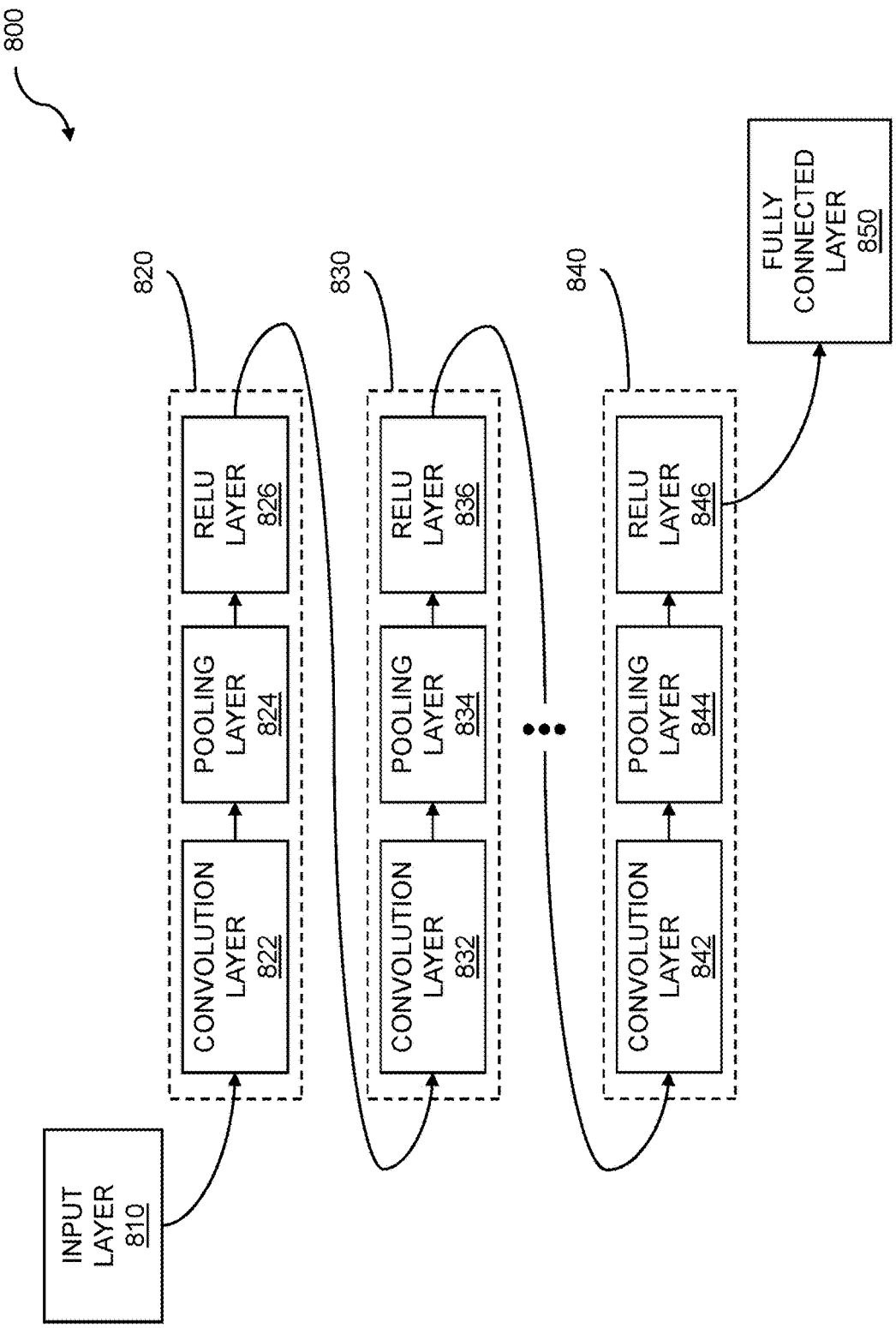
FIG. 8 illustrates a deep learning block diagram.

FIG. 8 illustrates a deep learning block diagram. The deep learning block diagram 800 can include a neural network such as a deep neural network (DNN), a convolutional neural network (CNN), a recurrent neural network (RNN), and so on. A convolutional neural network can be based on layers, where the layers can include input layers, output layers, fully connected layers, convolution layers, pooling layers, rectified linear unit (ReLU) layers, bottleneck layers, and so on. The layers of the convolutional network can be implemented using a reconfigurable fabric. The reconfigurable fabric can include processing elements, switching elements, storage elements, etc. The reconfigurable fabric can be used to perform various operations such as logical or other operations. Deep learning can be applied to neural network processing using specialized data representation. The layers of the neural network such as the convolutional neural network can be implemented within one or more integrated circuits or chips, where the chips can include a reconfigurable fabric, and FPGA, an ASIC, and the like. A given chip from among the one or more chips can implement one or more layers of the neural network. When a neural network such as a convolutional neural network cannot be loaded into a reconfigurable fabric, the neural network may be partitioned, where a partition may "fit" into the reconfigurable fabric, FPGA, ASIC, etc.

A deep learning block diagram 800 is shown. The block diagram can include various layers, where the layers can include an input layer, hidden layers, a fully connected layer, and so on. In some embodiments, the deep learning block diagram can include a classification layer. The input layer 810 can receive input data, where the input data can include a first collected data group, a second collected data group, a third collected data group, a fourth collected data group, etc. The collecting of the data groups can be performed in a first locality, a second locality, a third locality, a fourth locality, and so on, respectively. The input layer can then perform processing such as partitioning collected data into non-overlapping partitions. The deep learning block diagram 800, which can represent a network such as a convolutional neural network, can contain a plurality of hidden layers. While three hidden layers, a first hidden layer 820, a second hidden layer 830, and a third hidden layer 840 are shown, other numbers of hidden layers may be present. Each hidden layer can include layers that perform various operations, where the various layers can include a convolution layer, a pooling layer, and a rectified layer such as a rectified linear unit (ReLU) layer. Thus, a first layer 820 can include a convolution layer 822, a pooling layer 824, and a ReLU layer 826; a second layer 830 can include a convolution layer 832, a pooling layer 834, and a ReLU layer 836; and a third layer 840 can include a convolution layer 842, a pooling layer 844, and a ReLU layer 846. The convolution layers 822, 832, and 842 can perform convolution operations; the pooling layers 824, 834, and 844 can perform pooling operations, including max pooling, such as data down-sampling; and the ReLU layers 826, 836, and 846 can perform rectification operations. A convolutional layer can reduce the amount of data feeding into a fully connected layer. The block diagram 800 can include a fully connected layer 850. The fully connected layer can be connected to each data point from the one or more convolutional layers.

Data flow processors can be implemented within a reconfigurable fabric. Data flow processors can be applied to many applications where large amounts of data such as unstructured data are processed. Typical processing applications for unstructured data can include speech and image recognition, natural language processing, bioinformatics, customer relationship management, digital signal processing (DSP), graphics processing (GP), network routing, telemetry such as weather data, data warehousing, and so on. Data flow processors can be programmed using software and can be applied to highly advanced problems in computer science such as deep learning. Deep learning techniques can include an artificial neural network, a convolutional neural network, etc. The success of these techniques is highly dependent on large quantities of data for training and learning. The data-driven nature of these techniques is well suited to implementations based on data flow processors. The data flow processor can receive a data flow graph such as an acyclic data flow graph, where the data flow graph can represent a deep learning network. The data flow graph can be assembled at runtime, where assembly can include input/output, memory input/output, and so on. The assembled data flow graph can be executed on the data flow processor.

The data flow processors can be organized in a variety of configurations. One configuration can include processing element quads with arithmetic units. A data flow processor can include one or more processing elements (PEs). The processing elements can include a processor, a data memory, an instruction memory, communications capabilities, and so on. Multiple PEs can be grouped, where the groups can include pairs, quads, octets, etc. The PEs can be configured in arrangements such as quads and can be coupled to arithmetic units, where the arithmetic units can be coupled to or included in data processing units (DPU). The DPUs can be shared between and among quads. The DPUs can provide arithmetic techniques to the PEs, communications between quads, and so on.

The data flow processors, including data flow processors arranged in quads, can be loaded with kernels. The kernels can be included in a data flow graph, for example. In order for the data flow processors to operate correctly, the quads can require reset and configuration modes. Processing elements can be configured into clusters of PEs. Kernels can be loaded onto PEs in the cluster, where the loading of kernels can be based on availability of free PEs, an amount of time to load the kernel, an amount of time to execute the kernel, and so on. Reset can begin with initializing up-counters coupled to PEs in a cluster of PEs. Each up-counter is initialized with a value minus one plus the Manhattan distance from a given PE in a cluster to the end of the cluster. A Manhattan distance can include a number of steps to the east, west, north, and south. A control signal can be propagated from the start cluster to the end cluster. The control signal advances one cluster per cycle. When the counters for the PEs all reach 0 then the processors have been reset. The processors can be suspended for configuration, where configuration can include loading of one or more kernels onto the cluster. The processors can be enabled to execute the one or more kernels. Configuring mode for a cluster can include propagating a signal. Clusters can be preprogrammed to enter configuration mode. Once the cluster enters the configuration mode, various techniques, including direct memory access (DMA) can be used to load instructions from the kernel into instruction memories of the PEs. The clusters that were preprogrammed into configuration mode can be preprogrammed to exit configuration mode. When configuration mode has been exited, execution of the one or more kernels loaded onto the clusters can commence.

Data flow processes that can be executed by data flow processors can be managed by a software stack. A software stack can include a set of subsystems, including software subsystems, which may be needed to create a software platform. The software platform can include a complete software platform. A complete software platform can include a set of software subsystems required to support one or more applications. A software stack can include both offline and online operations. Offline operations can include software subsystems such as compilers, linkers, simulators, emulators, and so on. The offline software subsystems can be included in a software development kit (SDK). The online operations can include data flow partitioning, data flow graph throughput optimization, and so on. The online operations can be executed on a session host and can control a session manager. Online operations can include resource management, monitors, drivers, etc. The online operations can be executed on an execution engine. The online operations can include a variety of tools which can be stored in an agent library. The tools can include BLAS™, CONV2D™, SoftMax™, and so on.

Software to be executed on a data flow processor can include precompiled software or agent generation. The precompiled agents can be stored in an agent library. An agent library can include one or more computational models which can simulate actions and interactions of autonomous agents. Autonomous agents can include entities such as groups, organizations, and so on. The actions and interactions of the autonomous agents can be simulated to determine how the agents can influence the operation of an entire system. Agent source code can be provided from a variety of sources. The agent source code can be provided by a first entity, provided by a second entity, and so on. The source code can be updated by a user, downloaded from the Internet, etc. The agent source code can be processed by a software development kit, where the software development kit can include compilers, linkers, assemblers, simulators, debuggers, and so on. The agent source code that can be operated on by the software development kit (SDK) can be in an agent library. The agent source code can be created using a variety of tools, where the tools can include MATMUL™, Batchnorm™, Relu™, and so on. The agent source code that has been operated on can include functions, algorithms, heuristics, etc., that can be used to implement a deep learning system.

A software development kit can be used to generate code for the data flow processor or processors. The software development kit (SDK) can include a variety of tools which can be used to support a deep learning technique or other technique which requires processing of large amounts of data such as unstructured data. The SDK can support multiple machine learning techniques such as machine learning techniques based on GAMM, sigmoid, and so on. The SDK can include a low-level virtual machine (LLVM) which can serve as a front end to the SDK. The SDK can include a simulator. The SDK can include a Boolean satisfiability solver (SAT solver). The SAT solver can include a compiler, a linker, and so on. The SDK can include an architectural simulator, where the architectural simulator can simulate a data flow processor or processors. The SDK can include an assembler, where the assembler can be used to generate object modules. The object modules can represent agents. The agents can be stored in a library of agents. Other tools can be included in the SDK. The various techniques of the SDK can operate on various representations of a wave flow graph (WFG).

Figure 9:
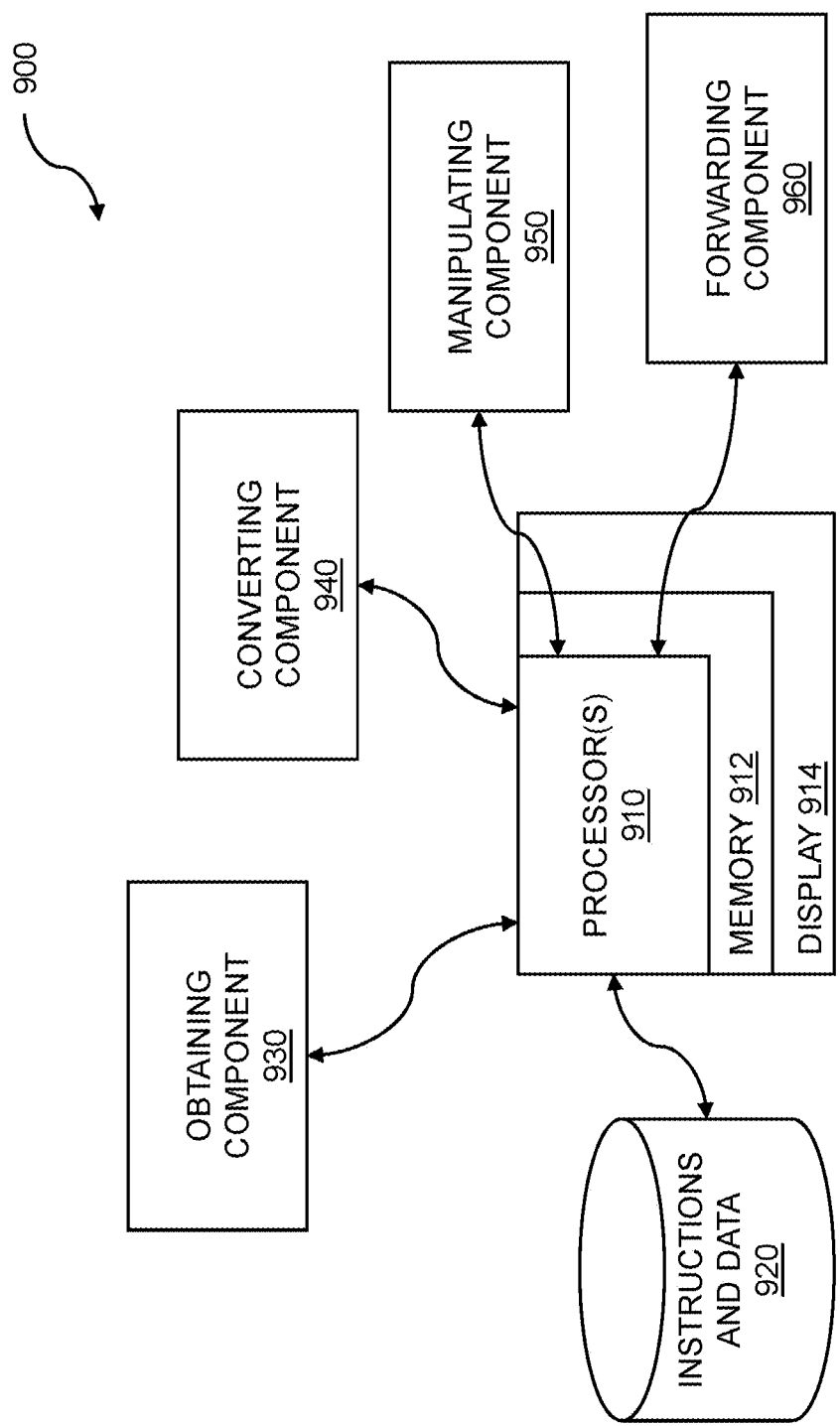
FIG. 9 is a system diagram for data manipulation.

FIG. 9 is a system diagram for data manipulation using representations as described above. The system 900 can include one or more processors 910 coupled to a memory 912 which stores instructions. The system 900 can include a display 914 coupled to the one or more processors 910 for displaying data, intermediate steps, instructions, and so on. In embodiments, one or more processors 910 are coupled to the memory 912 where the one or more processors, when executing the instructions which are stored, are configured to: obtain input data for manipulation in a layer of a neural network, wherein the manipulation is performed on a processor that supports single-precision operations; convert the input data to a 16-bit reduced floating-point representation, wherein the reduced floating-point representation comprises an alternative single-precision data representation mode; manipulate the input data with one or more 16-bit reduced floating-point data elements; and forward a result of the manipulating to a next layer of the neural network.

The system 900 can include a collection of instructions and data 920. The instructions and data 920 may be stored in a database, one or more statically linked libraries, one or more dynamically linked libraries, precompiled headers, source code, flow graphs, or other suitable formats. The instructions can include instructions for neural network processing using specialized data representation. In embodiments, the processors can include processing elements within a reconfigurable fabric, a parallel processor, a mesh processor, a distributed processor, programmable integrated circuits such as FPGAs or ASICs, and so on. The system 900 can include an obtaining component 930. The obtaining component can include functions and instructions for obtaining input data for manipulation in a layer of a neural network, where the manipulation is performed on a processor that supports single-precision operations. In embodiments, the input data can include single instruction multiple data (SIMD) data representations. Single-precision operations can be performed on single-precision data representations. The single-precision data representations can be used for training weights for a neural network. The system 900 can include a converting component 940. The converting component 940 can include functions and instructions for converting the input data to a 16-bit reduced floating-point representation. The reduced floating-point representation includes an alternative single-precision data representation mode. The converting the input data can include converting data to a floating-point data representation for use in neural network processing. The neural network processing can include image processing, an inference operation, a training operation, and the like.

The system 900 can include a manipulating component 950. The manipulating component 950 can include functions and instructions for manipulating the input data with one or more 16-bit reduced floating-point data elements. In embodiments, the one or more 16-bit reduced floating-point data elements can include one or more neural network weights, biases, activations, and so on. The system 900 can include a forwarding component 960. The forwarding component can include functions and instructions for forwarding a result of the manipulating to a next layer of the neural network. In embodiments, the next layer can be one of a plurality of layers within the neural network. As described throughout, the plurality of layers of a neural network can include input layers, output layers, fully connected layers, convolution layers, pooling layers, rectified linear unit (ReLU) layers, bottleneck layers, and so on. In embodiments, the layer of the neural network can include a reconfigurable fabric. The data that can result from the manipulating, by a layer, of data from a previous layer, can be forwarded to the next layer. In embodiments, the next layer can be an output layer.

The system 900 can include a computer program product embodied in a non-transitory computer readable medium for data manipulation, the computer program product comprising code which causes one or more processors to perform operations of: obtaining input data for manipulation in a layer of a neural network, wherein the manipulation is performed on a processor that supports single-precision operations; converting the input data to a 16-bit reduced floating-point representation, wherein the reduced floating-point representation comprises an alternative single-precision data representation mode; manipulating the input data with one or more 16-bit reduced floating-point data elements; and forwarding a result of the manipulating to a next layer of the neural network.

Each of the above methods may be executed on one or more processors on one or more computer systems. Embodiments may include various forms of distributed computing, client/server computing, and cloud-based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above-mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are limited to neither conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the foregoing examples should not limit the spirit and scope of the present invention; rather it should be understood in the broadest sense allowable by law.

What is claimed is:

1. A processor-implemented method for data manipulation comprising:
   obtaining input image data comprising a plurality of image channels for manipulation in a layer of a neural network, wherein the manipulation is performed on a processor that supports single-precision operations and the input image data comprises an 8-bit unsigned integer for each channel of the image data;

converting, for each channel of the image data, the 8-bit unsigned integer for that channel of the image data to a 16-bit reduced floating-point representation in a bfloat16 format without loss of precision in the image data, wherein the reduced floating-point representation comprises an alternative single-precision data representation mode;

manipulating each 16-bit reduced floating-point image channel with one or more 16-bit reduced floating-point data elements of the neural network; and forwarding a result of the manipulating to a next layer of the neural network, wherein each layer of the neural network is implemented by a reconfigurable fabric of a reconfigurable architecture.

2. The method of claim 1, wherein the manipulating includes a multiply and add-accumulate operation.

3. The method of claim 1, wherein the manipulating includes a unary operation, a binary operation, or a conversion operation.

4. The method of claim 1, wherein the one or more 16-bit reduced floating-point data elements comprise one or more neural network weights.

5. The method of claim 4, wherein the weights are trained using single-precision data representations.

6. The method of claim 5, further comprising converting the single-precision data representations into 16-bit reduced floating-point data representations for use in neural network processing.

7. The method of claim 1, wherein the manipulating comprises a dot-product operation.

8. The method of claim 1, wherein an operation employs a table lookup function to accomplish a division, a square root, a reciprocal, or a reciprocal square root calculation.

9. The method of claim 1, further comprising performing left or right versions of commands for the processor that support single-precision operations to handle 8-bit unsigned integer input.

10. The method of claim 9, wherein the performing enables hybrid data type support.

11. The method of claim 10, wherein the hybrid data type support includes support for an 8-bit unsigned integer representation and a 16-bit reduced floating-point representation.

12. The method of claim 1, further comprising including commands for the processor that support single-precision operands and 16-bit reduced floating-point representation operands in a same operation.

13. The method of claim 12, wherein the same operation comprises matrix multiplication.

14. The method of claim 13, wherein the same operation comprises a tensor operation.

15. The method of claim 1, wherein the 16-bit reduced floating-point representation comprises a bfloat16 data representation.

16. The method of claim 1, wherein the 16-bit reduced floating-point representation comprises a reduced mantissa floating-point representation.

17. The method of claim 1, wherein the manipulating includes mixed floating-point data elements.

18. The method of claim 17, wherein the mixed floating-point data elements include single-precision data elements.

19. A computer program product embodied in a non-transitory computer readable medium for data manipulation, the computer program product comprising code which causes one or more processors to perform operations of:

obtaining input image data comprising a plurality of image channels for manipulation in a layer of a neural network, wherein the manipulation is performed on a processor that supports single-precision operations and the input image data comprises an 8-bit unsigned integer for each channel of the image data;

converting, for each channel of the image data, the 8-bit unsigned integer for that channel of the image data to a 16-bit reduced floating-point representation in a bfloat16 format without loss of precision in the image data, wherein the reduced floating-point representation comprises an alternative single-precision data representation mode;

manipulating each 16-bit reduced floating-point image channel with one or more 16-bit reduced floating-point data elements of the neural network; and forwarding a result of the manipulating to a next layer of the neural network, wherein each layer of the neural network is implemented by a reconfigurable fabric of a reconfigurable architecture.

20. A computer system for data manipulation comprising:

a memory which stores instructions;

one or more processors coupled to the memory wherein the one or more processors, when executing the instructions which are stored, are configured to:

obtain input image data comprising a plurality of image channels for manipulation in a layer of a neural network, wherein the manipulation is performed on a processor that supports single-precision operations and the input image data comprises an 8-bit unsigned integer for each channel of the image data;

convert, for each channel of the image data, the 8-bit unsigned integer for that channel of the image data to a 16-bit reduced floating-point representation in a bfloat16 format without loss of precision in the image data, wherein the reduced floating-point representation comprises an alternative single-precision data representation mode;

manipulate each 16-bit reduced floating-point image channel with one or more 16-bit reduced floating-point data elements of the neural network; and forward a result of the manipulating to a next layer of the neural network, wherein each layer of the neural network is implemented by a reconfigurable fabric of a reconfigurable architecture.

* * * * *